United States Patent [19]
Hiersig et al.

[11] 3,930,379
[45] Jan. 6, 1976

[54] COMPENSATING AND EQUALIZING COUPLING FOR TRANSMISSION OF LARGE TORQUES, SUCH AS BETWEEN THE GEAR AND THE PROPELLOR OF A SHIP

[75] Inventors: Heinz M. Hiersig, Dusseldorf-Oberkassel; Wilhelm Köster, Datteln, both of Germany

[73] Assignee: Mannesmann-Meer Aktiengesellschaft, Monchen-Gladbach, Germany

[22] Filed: May 8, 1974

[21] Appl. No.: 467,955

[30] Foreign Application Priority Data
May 17, 1973   Germany............................. 2325543

[52] U.S. Cl........................ 64/11 R; 64/1 V; 64/14; 64/27 NM
[51] Int. Cl.²........................................... F16D 3/17
[58] Field of Search.......... 64/1 V, 1 R, 6, 11 R, 14, 64/27 NM, 27 R, 13

[56]   References Cited
UNITED STATES PATENTS
1,896,968   2/1933   Paton .............................. 64/27 NM 2,126,705   8/1938   Schmidt ....;........................... 64/11 R FOREIGN PATENTS OR APPLICATIONS
579,226   7/1946   United Kingdom.................. 64/11 R
536,140   8/1944   United Kingdom ............. 64/27 NM
750,729   5/1933   France ................................. 64/11 R

*Primary Examiner*—Benjamin W. Wyche
*Assistant Examiner*—Randall Heald
*Attorney, Agent, or Firm*—Ralf H. Siegemund

[57]   ABSTRACT

The coupling has two annular flanges respectively secured to driving and driven shafts and spaced apart axially. A hollow shaft is interposed between the flanges, and is connected to these flanges through holding elements extending axially from the flanges on the outside as well as inside of the shaft and being connected to the hollow shaft through individual rubber elements whereby a holding element on the outside is radially aligned with a holding element on the inside with two radially tensioned rubber elements inbetween, one on the inside and one on the outside. The holding elements as connected to one flange are on their axial other end interconnected by an annulus, two annuli facing each other in pairs and about the (axial) center of the hollow shaft but leaving a gap between.

14 Claims, 4 Drawing Figures

COMPENSATING AND EQUALIZING COUPLING FOR TRANSMISSION OF LARGE TORQUES, SUCH AS BETWEEN THE GEAR AND THE PROPELLOR OF A SHIP

BACKGROUND OF THE INVENTION

The present invention relates to an equalizing and compensating coupling for transfer of large torques, and more particularly the invention relates to a coupling interposed between the output shaft of a transmission gear and the propeller shaft of a ship.

Couplings used for transmission of large torques, particularly in ships drive systems, may have primary and secondary parts which have coaxial disposition to each other and to the respective axis of the couplings, and the two parts are interconnected by rubber-elastic elements. In a particular construction, a coupler sleeve may be interposed, and the primary and secondary clutch parts each connect to the sleeve through these resilient elements.

It is, however, necessary to consider the operating conditions for such a clutch or coupling in some detail. If the transmission of the ships drive is located near the stern, the propeller shaft will be rather short and exhibit rather high flexural stiffness and bending strength. On the other hand the higher strength of sheet metal as it is used for construction of ships hulls today permits employment of thinner sheet stock for that purpose so that the hulls are more resilient. Such increase in resiliency is particularly noticeable in the stern because the buyoncy differs for different loads. The resulting change in shape of the hull must not influence the position of the ship's drive generally and must not cause any change in gearing operation.

Ships gears are quite heavy, and for this reason they cannot merely be connected to the respective propeller shaft. Rather, the transmission must be mounted in some fashion to the frame of the ship. If, however, the propellor shaft moves with flexing of the hull, displacement of gear parts must be expected and has, in fact, been observed.

Several different solutions have been advanced to solve that problem. In accordance with a first solution, a thrust bearing is directly connected to the transmission gear; the latter has a small base bolted to the base of the thrust bearing. The base of the thrust bearing has usually significant strength.

In accordance with a second solution to the problem thrust bearing and transmission are separated, and the transmission is solely responsible for radially guiding the propeller shaft. Any vertical displacements of the bases of the thrust bearing and of the transmission gear is to be compensated in that manner.

In accordance with a third solution the transmission is mounted on level controlled cylinders so that changes in the location of its base are not transmitted to the transmission. Finally, it has been proposed to provide a transversely displaceable jaw clutch between propeller shaft and gearing, which clutch does not only transfer torque but compensates also for disposition changes as between thrust bearing and gearing.

All of these proposals for solving the problem have one drawback or another and are, therefore, not quite suitable, at least not to the desired extent.

A small base in accordance with the first proposal leads invariably to overhanging parts, particularly in twin gear systems. Moreover, a small base is not well suited to take up the reaction forces if the power transmitted is quite large. The separation of transmission and thrust bearing in accordance with the second proposed solution may suffice in the case of vertical, mutual displacement, but not when the angle between propeller shaft and transmission output shaft tends to change.

The levelled positioning of the transmission casing, also known as active positioning, is very complicated and too amenable to break down. The final solution was found to cause increasing stiffening of the jaw clutch with increasing torque while for low torques the clutch my start to rattle.

DESCRIPTION OF THE INVENTION

It is an object of the present invention to provide for a coupling structure which is usable as driving connection between a transmission, on the one hand and a thrust bearing and/or the propellor shaft, on the other hand.

It is a more general object of the present invention to provide for new and improved coupling for transmission of very large torques, even though the shaft may under-go lateral as well as angular displacement.

It is another object of the present invention to provide for a specific solution to the above outlined problem, for providing compensation as between the changes in shape of a ships hull so that these changes do not influence the relative disposition of propellor shaft and gearing, but are compensated by suitably placed resilient action and reaction.

It is, therefore a particular object of the present invention to improve a coupling in which coaxial primary and secondary parts are individually interconnected with a sleeve by means of rubber elastic elements.

In accordance with the preferred embodiment of the invention it is suggested to provide inner and outer cylindrical holding and mounting structures on each of the primary and secondary parts, and the coupler sleeve is interposed as a hollow shaft between the two inner structures on one hand and the two outer structures on the other hand in axially overlapping relation. The inner and outer structures for the primary coupling part and those for the secondary coupling part are secured to each other. All cylindrical structures are connected to the coupler sleeve by means of the resilient elements, of rubber or rubber-like elasticity and resiliency, whereby structure surfaces interconnected with the shaft face the shaft in radial direction and the resilient elements are interposed along that direction.

The cylindrical mounting structures are preferably realized by means of individual holding elements bolted to flanges, one flange being connected to a driving shaft and another flange to a driven shaft. The holding elements of an outer structure are radially aligned with the holding elements of the inner structure as connected to the same flange. Individual resilient elements connect each holding element to the coupler sleeve and hollow shaft.

The holding elements of the two structures pertaining to the same clutch part (primary or secondary) are additionally interconnected by annuli, whereby the connection to such annulus as well as connection to the respective flange establishes a radial compression bias of and for the resilient elements.

Torque is transferred between driving shaft and primary part and coupler sleeve or hollow shaft, as well as between that shaft and the secondary part and driven shaft by circumferentially effective thrust. Thus, even in the case of lateral and angular displacement as between primary and secondary coupling parts, no stiffening occurs, even on large torques.

The coupling can be placed between the transmission gearing on one hand and the thrust bearing for the propeller shaft in a ships drive on the other hand. The coupling readily compensates particularly displacements of the propellor shaft, due to hull flexing relative to the transmission gear. The degree of flexing and equalization needed depends on the individual case. The thickness of the resilient elements, i.e. their extension in radial direction is the parameter to be selected in accordance with the needed compensation and equalization. That thickness, however, should be smaller than azimuthal and axial dimensions of resilient elements. As a consequence, torsional elasticity is low while transverse and axial displaceability as between the primary and secondary coupling parts are quite high, even in the case of very large torques and power in excess of 10,000 horsepowers.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
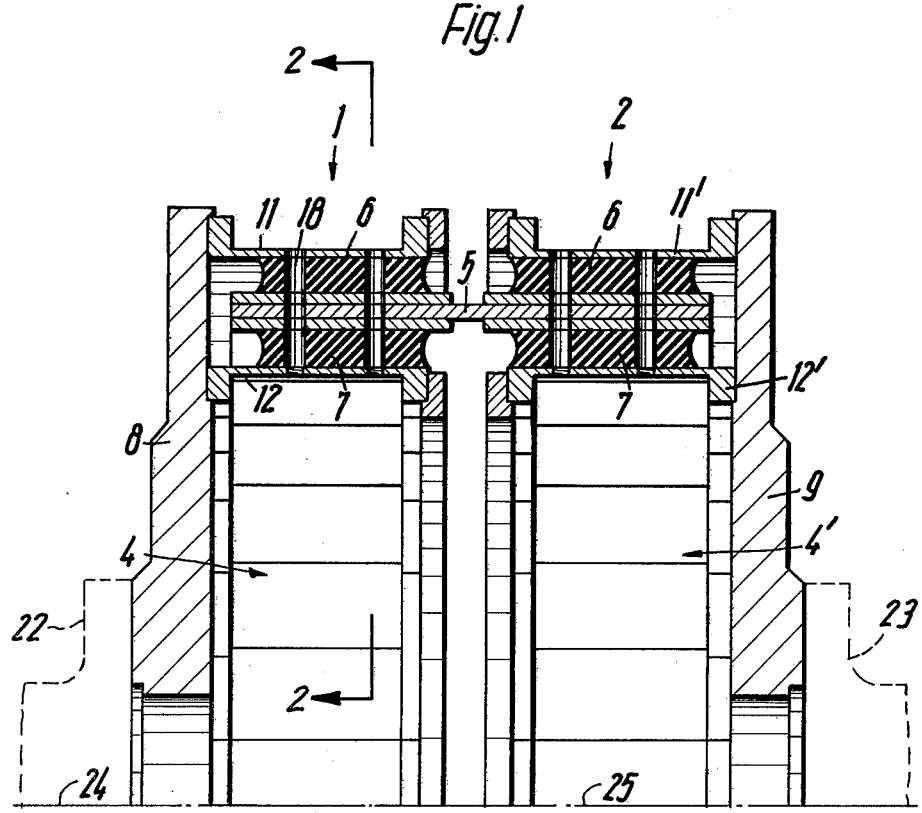
FIG. 1 is an axial-section view through a coupling in accordance with the preferred embodiment of the invention; showing only about one half (the upper half) of that section due to rotational symmetry.

Proceeding now to the detailed description of the drawings, the coupling illustrated has a primary or driving part 1 connected to the output shaft 22 of a transmission gear and constituting the driving shaft for the coupling. The axis of shaft 22 is denoted by 24. The coupling has a secondary or driven part 2, connected to a propeller shaft 23 having axis 25. It may be assumed, that a thrust bearing is provided on the propellor shaft.

The primary and secondary parts 1 and 2 of the coupling are basically of symmetrical construction (though details may differ). Each of these coupling parts has an annular flange, 8 and 9 respectively, whereby flange 8 is connected to shaft 22 and flange 9 is connected to shaft 23. An outer cylinder holding structure 3 and an inner cylindrical holding structure 4 is connected to flange 8 in concentric relation; an outer cylindrical holding structure 3' and an inner cylindrical holding structure 4' is connected to flange 9.

A coupler sleeve or hollow shaft 5 is coaxially and concentrically disposed to all holding structures and is particularly interposed between inner and outer structures in each instance. In particular, there is definite axial overlap and telescopic relation in the disposition of sleeve 5 with respect to each holding structure, in that the sleeve or shaft 5 is in the outer cylindrical holding structures and receives the respective inner holding and mounting structures. As far as radial dimensions are concerned, sleeve 5 is located in about the (radial) middle between inner and outer structures.

Inner and outer structures are provided in a cylindrical and cage-like configuration. The outer structures 3 and 3' are respectively established through a plurality of individual holding elements 11, 11', which are individually bolted to the respective flange, 8 or 9 as the case may be, and they are arranged concentrically to the respective axis, 24 or 25. Analogously, inner structures 4 and 4' are established by individual holding elements 12, 12' also being bolted to the respective flange, 8 or 9, whereby in particular each element 11 is radially aligned with an element 12; and each element 11' is radi aligned with an element 12'.

Each holding element such as 11, has a first flange 11a for bolting to annular flange 8 by means of bolts 10 while a second flange 11b on each element 11 is used to bolt the respective element to an annulus 13. Analogously each element 12 has a first flange 12a for bolting to flange 8 while a second flange 12b on each element 12 is bolted to an annulus 14.

It can thus be seen, that by virtue of bolting the elements 11 to annulus 13 as well as to flange 8 the outer cylindrical holding structure 3 is established by assembling individual holding elements, namely 11 in the stated manner. Analogously the inner holding 4 structure results from the assembly of holding elements 12 in a cylindrical configuration and bolting them to annulus 14 and flange 8. One can also say that structure 3 is comprised of the elements 11 as bolted to annulus 13 and establishing therewith a sleeve with slots, namely the gaps between azimuthally adjacent elements 11. Analogously structure 4 is comprised of the elements 12 as bolted to annulus 14 and establishes also a sleeve with slots, aligned with the slots in the respective concentric sleeve structure 3. Bolting may be carried out by means of releasable bolts 10 and 21.

The several outer holding elements 11 are interconnected with sleeve 5 by means of individual rubber or rubber-like, resilient elements 6 which are vulcanized or otherwise bonded, e.g. glued, to elements 11 in each instance. The respective (radial in the assembly) opposite end of each resilient element 6 is vulcanized or otherwise bonded to a plate 15. Each plate 15 is bolted to sleeve 5 in the proper location, by means of bolt-nut combinations 17.

Analogously, inner holding elements 12 are directly interconnected (e.g. vulcanized etc) with rubber or rubber-like resilient elements 7 which in turn are bonded to plates 16, and the plates 16 are bolted to sleeve 5 by the same bolts which bolt plates 15 to sleeve 5 because each combination of an element 11, a resilient element 6 and a plate 16 is radially aligned with a combination of an element 12, a resilient element 7 and a plate 16.

In order to permit bolting, plates 15 and 16 have axial extensions beyond the bonding interfaces with the respective resilient elements and this is true for each axial end on both coupling parts, 1 and 2.

The flange 8 has an annular recess 8a of particular diameter into which flanges 11a and 12a are inserted in the annular arrangement of the holding elements 11 and 12. The annuli 13 and 14 have recesses or shoulders to establish a definite circle for disposition of the flanges 11b and 12b in analogous manner. Even though annuli 13 and 14 are not rigidly interconnected, the structures as a whole are interconnected by the flange 8 and define a definite cylindrical annular space in which one end of sleeve 5 is inserted, at about half the diameter difference between inner and outer holding cylinders, whereby the resilient elements 6 and 7 are all radially compressed and biased. The assembly of these components can be understood best with reference to the right hand portion of FIG. 3.

Figure 3:
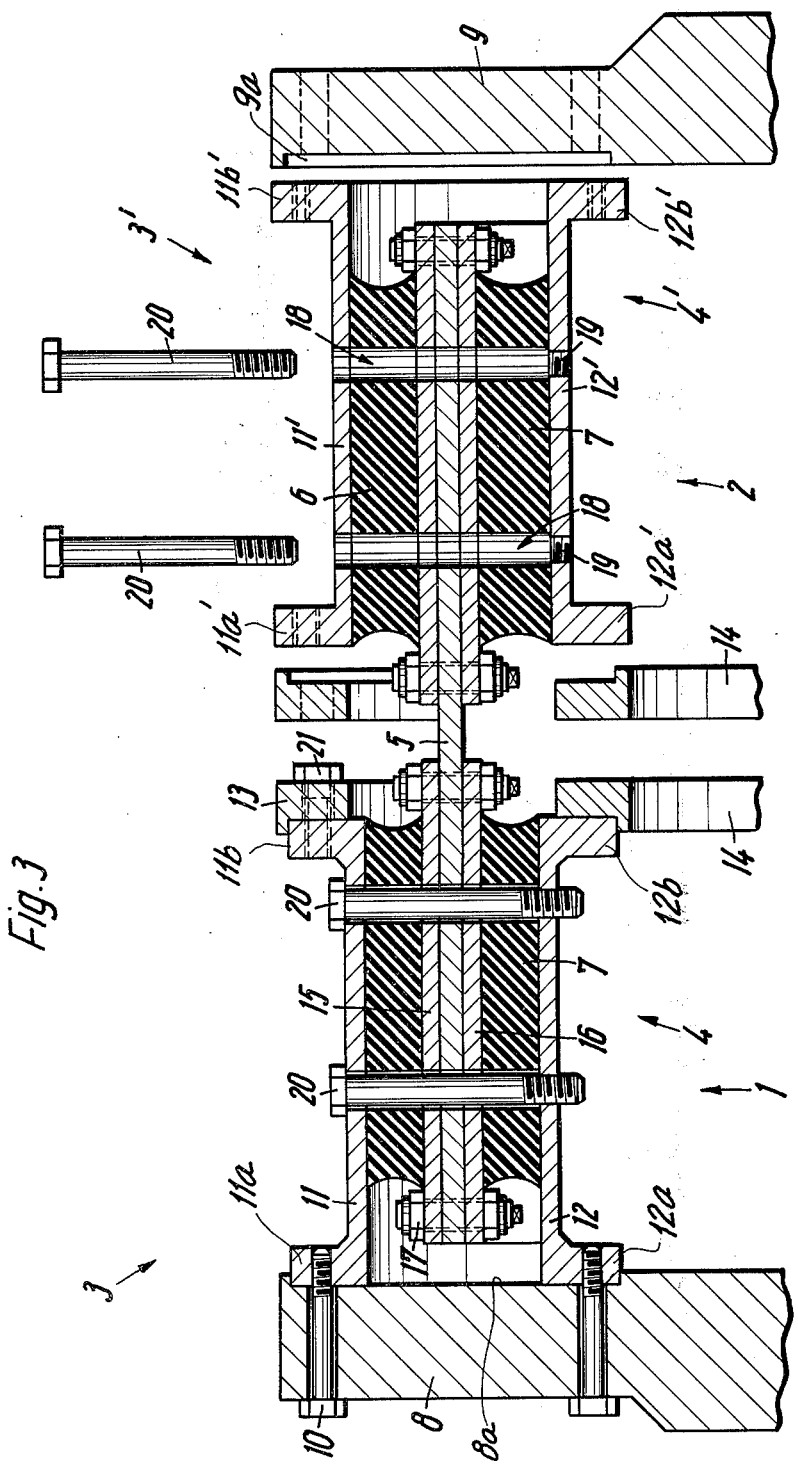
FIG. 3 is section view, similar to FIG. 1 but showing a portion only on a larger scale.

The right hand portion of FIG. 3, but also FIG. 1 shows that the driven or secondary side (2) of the coupling has outer holding elements 11' bolted (or to be bolted as per FIG. 3) to flange 9 and to an annulus 13'; there are also inner holding elements 12' bolted to flange 9 and to an annulus 14'. Each element 11', 12' respectively is bonded to a resilient element 6, 7 which in turn are bonded to plates 15, 16.

Each resilient element 6, 7, each plate 15, 16 and each element 11, 11', 12, 12' has two bores, which for each holding element/rubber element/plate sub-assembly are aligned. Moreover, there are corresponding bores in sleeve or hollow shaft 5 so that in each instance seven individual bores can be aligned radially, due to the radial alignment of, an element 11 (or 11'), a rubber element 6, a plate 15, the appropriate location of sleeve 5 where having such bores, a plate 16, an element 7 and an element 12 (or 12'). Such seven radially registering bores are denoted with reference numeral 18.

As can be seen best in FIG. 3, all these bores in each element have similar diameter, excepting holding elements 12 and 12' having bores 19 of a diameter which is smaller than the others and, also unlike the others, is threaded. This way, bolts 20 can be inserted and threaded into the bores 19 of element 12 (or 12') while the head of each bolt engages a plate 11 (or 11'). Upon tightening the bolts, resilient bias is provided in each of the respective two interposed rubber elements 6 and 7, effective therein by radial compression with reference to the common axis 24, 25 about which they are assembled.

As indicated above, the FIG. 3 shows the completed connection for the several holding elements etc. as far as mounting to flange 8 is concerned, while the right hand side of the Figure shows inner and outer holding structure, resilient elements and coupler sleeve in superimposed but not yet tightened configuration. The flanges 11'a, 12'a of the respective parts 11 and 12 cannot yet bet bolted to flange 9 because the resilient parts 6 and 7 of that portion have not yet been compressed; the same is true with regard to bolting flanges 11'b, 12'b to annuli 13', 14'.

Accordingly, bolts 20 will be inserted into the respective seven-aligned-bores 18 and threaded into bores 19 to compress (radially) the rubber elements as sandwiched inbetween, until the flanges of parts 11 and 12 can be inserted in the recess 9a of flange 9 whereupon the several bores are aligned for bolting of flanges 11'a, 12'a to flange 9.

The same is true as far as annuli 13', 14' is concerned; compression of the rubber elements 6 and 7 is needed to place the bores in flanges 11'b, 12'b of parts 11' and 12' into alignment with the bolting bores in annuli 13' and 14'.

The left hand side of FIG. 3 shows the completed assembly as far as connection to flange 8 and to annuli 13 and 14 is concerned. However, once that bolting connection has been completed, bolts 20 are no longer needed and can be removed. Actually, they must be removed prior to setting shaft 22 into rotational motion, because flexing of the resilient elements must be permitted. Particularly, hollow shaft 5 must be permitted to undergo annular skew and lateral displacement; also, axial displacement within the constraint of resilient deflection of elements 6 and 7 should be permitted. The resulting compensating operation of the coupling is depicted by way of example in FIG. 1a.

The right hand part of FIG. 3 is in parts an exploded view from which one could conclude that flange 9 has to be shifted axially to permit bolting thereof to parts 11' and 12'. Indeed, assembling the coupling is facilitated when flanges 8 and 9 have not yet fixed axial distance from each other. However, the construction as a whole still permits assembly, even without axially displacing flanges 8 and 9. This is important as these flanges pertain to shafts 22 and 23 which may have already definite disposition to each other no longer permitting axial displacement. Assembly of the coupling without displacement of flanges 8 and 9 is needed also when rubber parts 6 and 7 are to be exchanged without having to shift the flanges (and the shafts 22, 23 to which they are connected). The elasticity of parts 6 and 7 can be taken advantage of for this purpose.

For purposes of disconnection of any of the holding structures the annuli 13, 14, for example, are disconnected from all the parts 11 and 12. Next, bolts 10 are taken out. Upon release from flange 8 elements 11 and 12 can be shifted axially out of recess 8a because resilient elements 6 and 7 permit axial deflection. Shaft 5 is also axially movable (to the right) because it is not rigidly secured to flange 9.

Next, one will proceed in the same manner on the other end, adjacent flange 9. Thereafter the entire assembly which was bolted to flanges 8 and 9 can be taken out from the space between these two flanges, and the individual plates 15 and 16 can be conveniently unfastened from shaft 5, particularly for an exchange of the resilient elements.

Initial assembly and reassembly is carried out in the reverse order whereby plates 15, 16 are connected to one end of sleeve 5 in the stated manner, and, for example, parts 11, 12, 13, 14 are assembled with radial compression provided by bolts 20. Since sleeve 5 is still axially movable as a whole, the assembly, as held together by bolts 20 can be shifted axially into recess 8a and bolted to flange 8.

The other (right hand) end of sleeve 5 clears flange 9, but elements 11' and 12' with rubber elements cannot be placed with their plates 15, 16 in bore-to-bore aligned position on sleeve 5. Elements 11', 12' cannot be assembled by bolts 20 at that point. If, however, bolts 20 are taken out of the left hand assembly 1, sleeve 5 can be shifted to the left, flexing elements 6 and 7 of the assembly 1 axially so that the bores of the right assembly 2 are aligned and now elements 6 and 7 can be compressed by means of bolts 20 so that flanges 11b' and 12b' clear the edge of recess 9a point. However it may not be practical to shift sleeve 5 as a whole to the left, and it may be more practical to flex the rubber elements of each pair of elements 11', 12', that is and as it is being connected to flange 9. Therefor bolts 20 cannot be used in that case for obtaining the needed radial compression of elements 6, 7 for assembly 2.

Tools are inserted into the interior of the space between flange 9 and inside of tube or sleeve 5 through appropriate openings in flanges 8 and/or 9. These tools, individually provide radial urging of a pair of parts 11' and 12' towards each other until they can slip into recess 9a, whereupon they are bolted thereto, and to annuli 13' and 14'. The process proceeds from pair to pair of parts 11', 12' until all are connected to flange 9 and annuli 13' and 14'. The bolts 20 may have been removed on the other side of sleeve 5 to aid in the flexing and positioning of parts 11' and 12' in each instance.

By way of example a coupling for the transmission of 25,000 horsepowers requires an outer diameter of about 2 to 2.5 meters (i.e. about 7 feet to 8 feet) with a propellor shaft of a diameter of 600mm (about 24 inches). The flanges are sufficiently large to provide for apertures permitting insertion of tools without weakening of structure. Moreover such openings may actually be provided for simply to hold the weight of the coupling down.

Figure 1A:
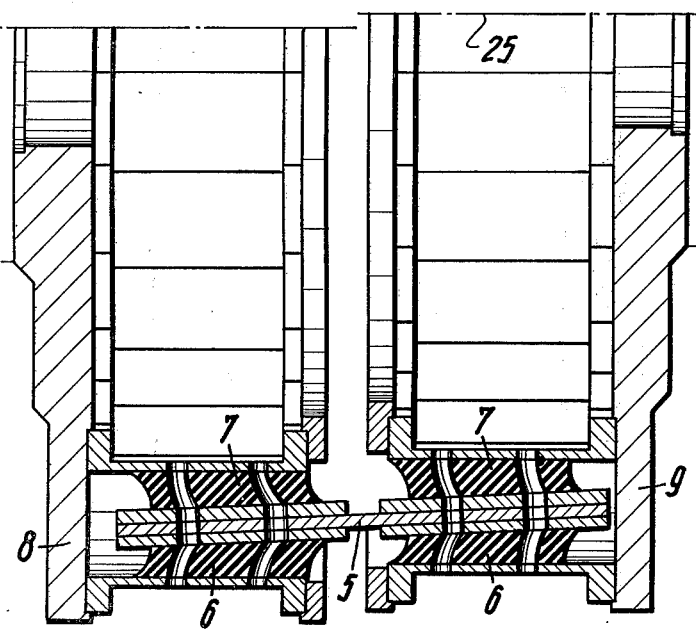
FIG. 1a can be interpreted as the other half of the section as per FIG. 1, except that clutch parts have been shown in mutual displacement as it may occur during operation.
Figure 2:
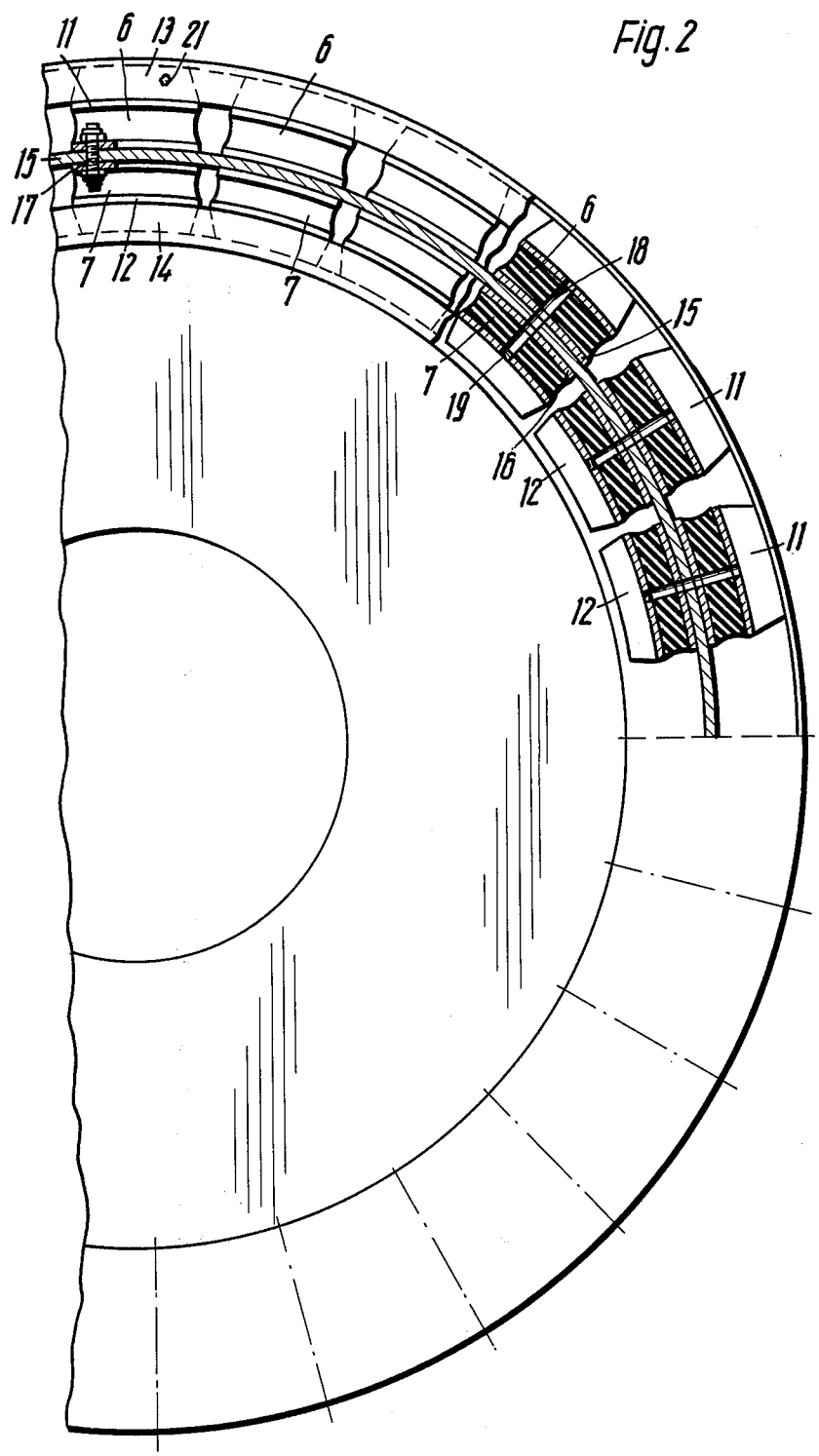
FIG. 2 is a section view along line 2—2 in FIG. 1.

As can be seen from FIG. 1a, the coupling in accordance with the invention is well suited to provide for compensation and equilization in the case of displacement of axes 24 and 25 as well as in the case of a slight tilt. Since the sleeve 5 functions as a hollow shaft and since resilient coupling elements 6 and 7 are connected thereto on the inside and on the outside large torques can indeed be transmitted.

Circumferential acting forces (as provided by the driving input part) are transmitted upon the hollow shaft via the resilient elements as thrust and that in turn is instrumental in avoiding stiffening of these elements nor do they resist displacement of the axes by tilt and/or lateral displacement other than by resilient reaction, even in the case of large torque.

The thickness (radially) of elements 6 and 7 is to be selected in accordance with anticipated displacements of that kind and is quite small. By way of example. The radial extension (thickness) of each resilient element is significantly smaller than its axial as well as azimuthal extension. Furthermore, the radial distance of an outer element 11 from its respective inner counter part 12 (or 11' from 12') is to be about 6 to 10% of the outer diameter of the coupling. That diameter is determined essentially by the assembled outer elements 11 and 11'.

The elements 6 and 7 when assembled are radially tensioned and as a consequence this compensating and equalizing coupling has a characteristical low torsional elasticity, and its compensation function as far as taking up transverse and axial displacements (both occur on tilting) is not impeded even under full, rated torque. This is particularly important if, as already mentioned by way of example the load and power is in excess of 10,000 horsepower.

The invention is not limited to the embodiments described above but all changes and modifications thereof not constituting departures from the spirit and scope of the invention are intended to be included.

We claim:

1. Compensating and equalizing coupling for transmission of large torques, such as between a ship's drive transmission gear and a propellor shaft, comprising:
   a hollow shaft;
   means (a) including
   i. a first, cylindrical structure having larger diameter than the shaft and receiving one end of the shaft in axially overlapping relation;
   ii. a second, cylindrical structure having smaller diamater than the shaft and being received by the shaft at the one end in axially overlapping relation;
   iii. means for interconnecting the first and second structures independently from the hollow shaft and connecting the interconnected structures to serve as primary input part of the coupling; and
   iv. a first plurality of resilient elements interposed radially between and connected to the shaft and said first and second structures to provide for radially extending resilient interconnection between the shaft and said structures; and
   means (b) including:
   i. a third cylindrical structure having larger diameter than the shaft and receiving the other end of the shaft in axially overlapping relation, but axially spaced apart from the first structure;
   ii. a fourth cylindrical structure having smaller diameter than the hollow shaft and being received by the shaft at the other end in axially overlapping relation, but axially spaced apart from the first structure;
   iii. means for interconnecting the third and fourth structures and connecting these interconnected structures to serve as secondary, output part of the coupling; and
   iv. a second plurality of resilient elements interposed radially between and connected to the shaft and said third and fourth structures to provide for radially extending resilient interconnection between the shaft and said third and fourth structures;
   so that said hollow shaft floats between the elements of the first to fourth pluralities and remains disconnected from said gear and said shaft except through the means (a) and the means (b) which in turn are interconnected only by said hollow shaft.

2. Coupling as in claim 1, the two means for interconnecting including respectively first and second flanges to which the first and second structures and the third and fourth structures are respectively connected, the first flange connected to a drive shaft, the second flange connected to a driven shaft.

3. Coupling as in claim 1, wherein the structures each being comprised of a plurality of individual elements which when interconnected establish the respective cylindrical structures, whereby an element of the first structure is radially aligned with an element of the second structure, and an element of the third structure is radially aligned with an element of the fourth structure.

4. Coupling structure as in claim 3, the elements of the first and second structures being connected to a first flange, the elements of third and fourth structures being connected to a second flange, the first and second flanges respectively included in the two means for interconnecting.

5. Coupling structure as in claim 4, wherein the two means for interconnecting further including four annuli respectively for interconnecting the elements of the first through fourth structures.

6. Coupling as in claim 3, wherein a separate resilient element of the plurality is disposed between each element of the plurality and the hollow shaft.

7. Coupling as in claim 6 wherein each resilient element is bonded to the respective holding element.

8. Coupling as in claim 6, wherein each resilient element is bonded to a plate at an interface therewith, the respective plates being fastened to the hollow shaft.

9. Coupling as in claim 8, wherein the plates have larger extension in axial direction than the respective axial extension of the resilient elements.

10. Coupling as in claim 9, wherein each plate where extending beyond the interface with the respective resilient element is bolted to the hollow shaft.

11. Coupling as in claim 3, wherein two holding elements on the plurality and two resilient elements of the plurality establish a sub-assembly connected to the hollow shaft, there being aligned bores in the elements of the subassembly for insertion of tightening bolts.

12. Coupling as in claim 1, wherein the radial distance between first and third structures on one hand and the second and fourth structures on the other hand is about 6 to 10% of the diameter of the first and third structures.

13. Coupling as in claim 1, wherein the means for interconnecting provide for radial tension bias of the resilient elements.

14. Coupling as in claim 1, wherein the resilient elements have radially smaller dimensions than their respective dimensions in axial and in azimuthal direction.

* * * * *